J. W. Meaker.

Coin Counter.

Nº 76,493. Patented Apr. 7, 1868.

Witnesses:
P. T. Dodge
Geo. Johnson

Inventor:
J. W. Meaker
by Dodge & Munn
his Attys

United States Patent Office.

J. W. MEAKER, OF CHICAGO, ILLINOIS.

Letters Patent No. 76,493, dated April 7, 1868.

---

IMPROVEMENT IN APPARATUS FOR ASSORTING COIN.

---

The Schedule referred to in these Letters Patent and making part of the same.

---

TO ALL WHOM IT MAY CONCERN:

Be it known that I, J. W. MEAKER, of Chicago, in the county of Cook, and State of Illinois, have invented certain new and useful Improvements in Devices for Assorting, Receiving, Holding, and Presenting for Delivery, Coin and Fractional Currency; and I do hereby declare that the following is a full, clear, and exact description thereof, reference being had to the accompanying drawings, making part of this specification, and to the letters of reference marked thereon, like letters indicating like parts wherever they occur. To enable others skilled in the art to construct and use my invention, I will proceed to describe it.

My invention relates to devices for assorting, receiving, holding, registering, and presenting for convenient delivery, and counting, coin and fractional currency, and consists in a novel arrangement and construction of inclined ways for assorting, and vertical tubes for assorting, receiving, registering, and presenting the coin, and also of forms, with easy-fitting covers, open at the top, for holding and presenting fractional currency.

These devices are, in the main, improvements on the patent granted me, January 28, 1868, and on the devices for which I have an application for a patent now pending in the Patent Office. In the drawings—

Figures 1, 2, and 3, are longitudinal vertical sections, that of fig. 3 being taken on the line $x\,x$ of fig. 4, and that of fig. 2 on the line $y\,y$ of fig. 5.

Figure 4 is a front elevation.

Figures 5, 6, and 7, are top plan views.

Figure 1:
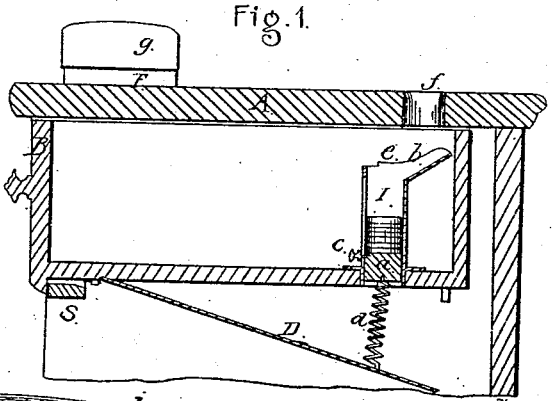
Figures 3, 4:
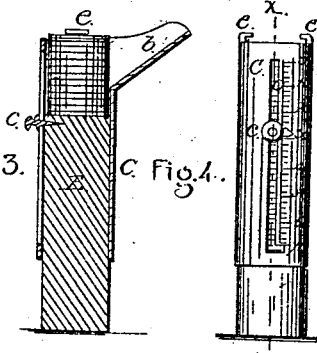

I construct a box, A, of any desired size, and provide it with a drawer, B. On the upper side of the bottom of the drawer B, I attach a vertical tube, I, having a hopper, $b$, at its upper end, and a vertically-sliding bottom or follower, $a$, with a small index-pointer, $c$, attached to it, the neck of which slides in a vertical slot on the side of the tube, and the vertical slot has along its margin numbered graduations to which the index points. The arrangement of the slot, index-pointer, and graduations is the same as shown in fig. 4. On the top of the tube C, I place, on each side of it, clips or flanges $e$, shown better in figs. 3 and 4, for holding the coin in the tube. On the under side of the drawer B, and near its front end, I hinge an arm, D, and connect it near its opposite end with a spiral or other suitable spring, $d$, to the vertically-sliding bottom $a$, as shown in fig. 1. Immediately over the hopper $b$, I make a suitable opening, $f$, for the passage of the coin to the hopper. As the coin is dropped through the opening $f$, it falls into the hopper $b$, and slides into the vertical tube C: and when the drawer is pulled out, the arm D is thrown up by striking against the support $s$ of the drawer, and through the spiral spring $d$ presents the coin at the top of the tube I, from whence they can be readily slid off and counted. When the drawer is out, the coin may be thrown into the hopper, if desired, and, as the drawer is shoved in, the bottom of the tube descending, they will slide into the tube.

It is obvious that instead of one tube, as shown in fig. 1, several may be arranged in a similar manner for receiving coins of different sizes, and that they may be filled by an assorter similar to that described in my said patent, or one modified as in my said pending application, or those hereinafter described.

Instead of arranging my tubes as above described, I also arrange and construct them as clearly shown in figs. 3 and 4, to slide loosely over posts E; and in this case, as in the other, I provide the tube C with a hopper, $b$, catches or flanges $e$, index-pointer $c$, register and vertical slot $o$, as above described. But in this case the index-pointer is attached to the post E, but the vertical slot is continued at the bottom, at right angles, as shown in fig. 4, so that when the tube C is drawn up, it may be turned a short distance round, when the neck of the index-pointer will hold the tube up.

In this arrangement and construction, the coin are thrown into the hopper $b$, and by raising up the tube C, they will slide into it. The tube is then dropped, and is supported by the flanges $e$ catching on the top of the coin, as shown in fig. 3. The coin can then be slid off the top of the column, one at a time, with the finger, and the index-pointer will indicate the number at any time in the tube.

It is obvious that there may be a series of these, with tubes arranged in this way upon them. They may be of different sizes, to suit different-sized coin, or they may be of the same size, to suit a larger quantity, and with their post, may be arranged in a row, and at any place convenient for use.

Figure 2:
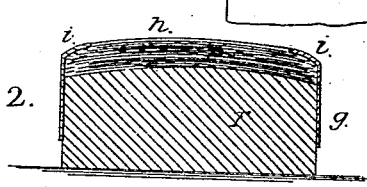
Figure 5:
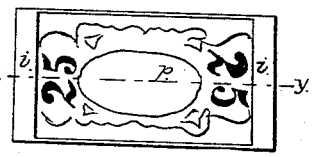

My device for fractional currency, I construct as shown in figs. 2 and 5, by making a form, F, of any suitable material, either hollow or solid, a little rounding on its upper surface. This surface I make of the size of the currency p, which is placed upon it. Over this form F, I place an easy-fitting metallic cover, g, as shown in fig. 2, open at the top, except at the ends i, which rest upon and hold the currency, as shown in figs. 2 and 5.

In using this device, I place the currency on the form F, and then slide the cover g over them, or the cover may be held up a little and the currency slipped under it. The cover g will then rest upon the currency, and it can be easily taken off, one piece at a time, with the thumb and finger, and, as taken off, the cover will drop down and hold the balance. This form F may be attached to the box A, with others of different sizes, for holding fractional currency of different denominations, or they may be arranged in any place convenient for use.

Figures 6, 8:
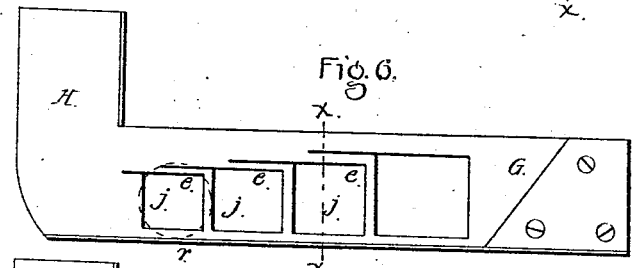
Figure 8 is a cross-section on the line $x\,x$ of fig. 6.
Figures 7, 9:
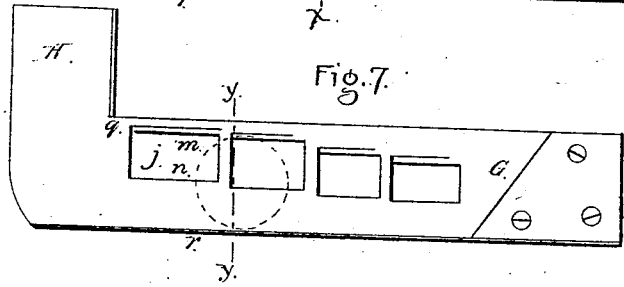
Figure 9 is a cross-section on the line $y\,y$ of fig. 7.

In the construction of my improvement in the coin-assorter, I make the inclined way G either as shown in figs. 6 and 8, or as shown in figs. 7 and 9. As shown in figs. 6 and 8, I construct it with a hopper, H, upturned edge r, and openings of different sizes, j. I cut the way G on a line with the upper side of each opening, the length of the opening next above, so that the corner, l, of the openings may be inclined a little below the opening next following, as shown in figs. 6 and 8. When this is done, as the coin rolls along the upturned edge i, its upper side will follow the inclined corner, l, and drop off into its proper receptacle. An assorter, made in this way, is always sure of delivering the coin at the proper place, delivering the smaller coin first.

An assorter may also be made to deliver the larger coin first, by arranging the openings, j, as shown in figs. 7 and 8. When made in this way, I fix the distance from the edge r to the lower side m of the openings, so that whenever more than half the weight of the coin shall be above the lower side, n, of the opening, the coin will tilt and drop through, and its dropping through at the proper place I make more certain by cutting in the upper side of the opening, so as to make a narrow strip, q, which I bend upwards, as shown in fig. 9, and which allows the coin adapted for each opening to run under it and drop through, as before.

These assorters may be used in any way desired, by being placed over a series of tubes, into which it is desired to distribute coin of different sizes, and from which they are to be delivered, as described above, or as in my said patent, or pending application.

Having thus described my invention, what I claim as my improvements are—

1. The drawer B, with tube I, having flanges e, in combination with the arm B, spring d, and follower a, constructed and arranged to operate substantially as described, and for the purpose set forth.

2. The stationary post E, in combination with the sliding tube C, with flanges e, slot o, and register, constructed and arranged to operate substantially as described, and for the purpose set forth.

3. The form F, in combination with the sliding cover g, constructed substantially as described, and for the purpose set forth.

4. In a coin-assorter, an inclined way, G, having the sides of the openings j forming the angle l, inclined so as to deliver the coin below the upper line of the next opening, substantially as described.

5. In a coin-assorter, an inclined way, C, having the openings j so arranged that the gravity of the coin will tilt them, and provided with a slit or lip, q, bent upward, for the coin to run under, and secure their tilting and delivery, substantially as described.

J. W. MEAKER.

Witnesses:
J. McKenney,
W. A. McKenney.